(12) United States Patent
Zheng

(10) Patent No.: US 11,395,161 B2
(45) Date of Patent: Jul. 19, 2022

(54) METHOD AND SYSTEM TO SELECT A COMMUNICATION MODE

(71) Applicant: T-Mobile USA, Inc., Bellevue, WA (US)

(72) Inventor: Pei Zheng, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 153 days.

(21) Appl. No.: 16/993,430

(22) Filed: Aug. 14, 2020

(65) Prior Publication Data

US 2022/0053343 A1 Feb. 17, 2022

(51) Int. Cl.
*H04W 24/02* (2009.01)
*G06N 20/00* (2019.01)
*G06K 9/62* (2022.01)
*H04W 52/02* (2009.01)

(52) U.S. Cl.
CPC .......... *H04W 24/02* (2013.01); *G06K 9/6262* (2013.01); *G06N 20/00* (2019.01); *H04W 52/0225* (2013.01); *H04W 52/0258* (2013.01)

(58) Field of Classification Search
CPC ............. H04W 24/02; H04W 52/0225; H04W 52/0258; H04W 16/10; H04W 76/10; H04W 72/04; H04W 28/16; H04W 16/14; H04W 52/02; H04W 52/0229; H04W 52/028; G06K 9/6262; G06N 20/00; H04B 1/1615
See application file for complete search history.

(56) References Cited

U.S. PATENT DOCUMENTS 8,655,307 B1 * 2/2014 Walker .............. H04W 52/0258
455/574

OTHER PUBLICATIONS

Casas, Pedro, et al. "Next to you: Monitoring quality of experience in cellular networks from the end-devices." IEEE Transactions on Network and Service Management 13.2 (2016): 181-196. (Year: 2016).*

* cited by examiner

*Primary Examiner* — Sharad Rampuria
(74) *Attorney, Agent, or Firm* — Loeb & Loeb LLP

(57) ABSTRACT

By analyzing the apps on a portable computing device 500, the communication modes used by the portable computing devices 500 and the communication requirements of the apps at a given time, an ideal communication mode given a certain mix of apps operating on a portable computing device 500 at a given point in time may be determined.

14 Claims, 5 Drawing Sheets

METHOD AND SYSTEM TO SELECT A COMMUNICATION MODE

BACKGROUND

The background description provided herein is for the purpose of generally presenting the context of the disclosure. The work of the presently named inventor, to the extent it is described in this background section, as well as aspects of the description that may not otherwise qualify as prior art at the time of filing, are neither expressly nor impliedly admitted as prior art against the present disclosure.

Different applications on portable computing devices have different network requirements and battery drain requirements. If faster network connections are available, the speed may not be required by the apps that are currently operating. In addition, some of the communication modes may drain the power source of the portable computing device faster than other communication modes.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

By analyzing the apps on a portable computing device, the communication modes used by the portable computing devices and the communication requirements of the apps at a given time, an ideal communication mode given a certain mix of apps operating on a portable computing device at a given point in time may be determined. In addition, locations may have some communication modes and other locations may have different communication modes and the ideal communication mode may be selected based on the requirements of the apps on the portable computing device.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

SPECIFICATION

Different applications on portable computing devices 500 (FIG. 5) have different network requirements and battery drain requirements. If faster network connections are available, the speed may not be required by the apps that are currently operating. In addition, some of the communication modes may drain the power source of the portable computing device 500 faster than others. At the same time, some apps may require more bandwidth and lower latency to be effective and not be frustrating. Matching an application that requires low bandwidth with a communication mode that may have a high bandwidth and high power draining, especially when a power level is low on a portable communication device, makes little sense. Similarly, matching an application that requires high bandwidth with a communication mode that has low bandwidth, especially when the power level is high on a portable communication device, also makes little sense.

By analyzing the applications on a portable computing device 500, the communication modes used by the portable computing devices 500 and the communication requirements of the apps at a given time, an ideal communication mode given a certain mix of apps operating on a portable computing device 500 at a given point in time may be determined. In addition, locations may have some communication modes and other locations may have different communication modes and the ideal communication mode may be selected based on the requirements of the apps on the portable computing device 500 while also taking into account the available power and available communication modes at a location at a point in time.

Figure 1:
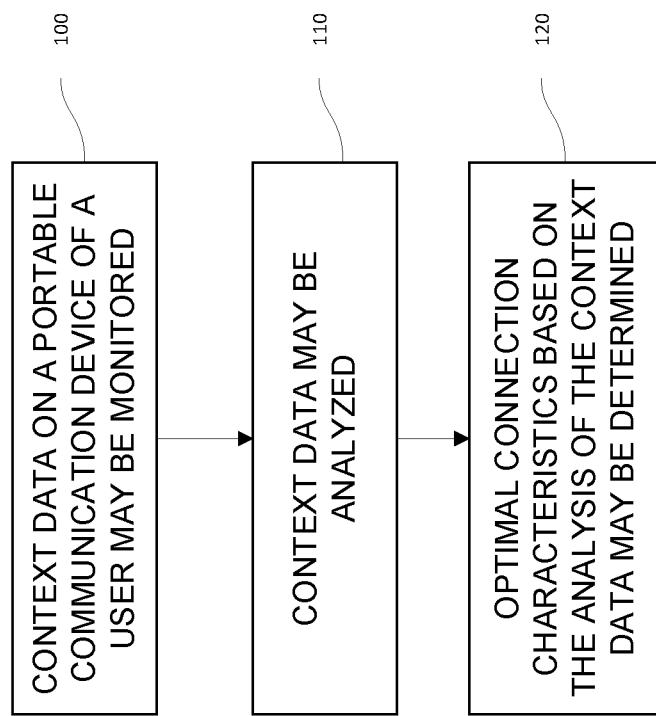
FIG. 1 may illustrate apps operating on a portable computing device.

Referring to FIG. 1, a method of analyzing portable computing devices 500 for analyzing context data to maximize performance may be disclosed. At block 100, context data on a portable computing device 500 of a user may be monitored. The context data may include a time of day the portable computing device 500 is used, a location the portable computing device 500 is used, the various communication forms available to the portable computing device 500, a signal strength of various communication forms at the portable computing device 500, applications used on the portable computing device 500, throughput needed for the applications operating on the portable computing device 500, latency needed by the applications used by the portable computing device 500, acceptable error rate of the various communication forms and battery usage by the applications used by the portable computing device 500. Of course, additional data may be included as context data such as whether the portable computing device 500 is using an outside electrical source, the number of missed communication packets, etc.

An application may be a program or a computer executable set of instructions for the processor on the portable computing device 500. The application or app may be adapted to be displayed on the portable computing device 500 and may be adapted to the unique requirements of the portable computing device 500 such as attempting to save battery life and utilizing the input output system of the portable computing device 500 to provide data to and from the portable computing device 500. As will be described further, the computer executable instruction may physically configure the gates and logic in the processor in the portable computing device 500 to execute the method.

Figure 5:
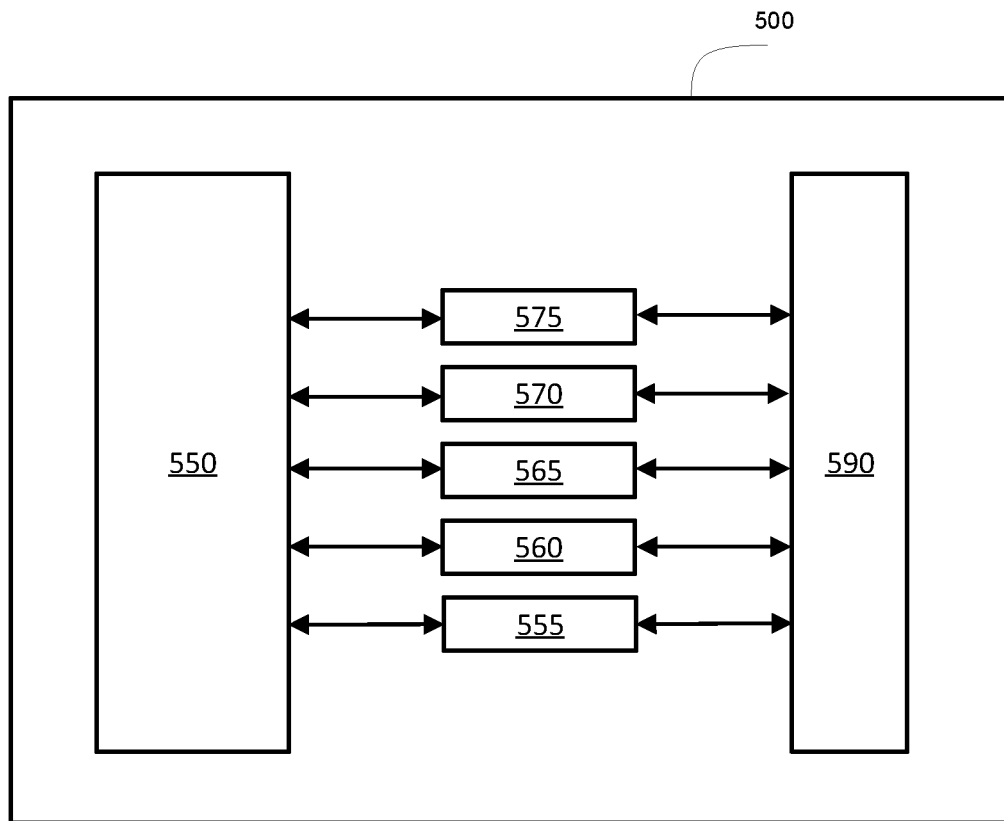
FIG. 5 may be an illustration of the computing elements used by the system.

The portable computing device 500 may be further described in relation to FIG. 5. In one example, the portable computing device 500 may be a smart phone or cellular phone. In another embodiment, the portable computing device 500 may be a tablet type computing device. In another embodiment, the portable computing device 500 may be a wearable device like a watch, a ring, or a necklace.

The monitoring may occur in a variety of ways. In one embodiment, an electronic log may be kept of the portable computing device 500 and the log make keep the context data. In another embodiment, some of the context data may be determined remotely such as at a cellular tower or a base station and the remote data and data local to the portable computing device 500 may be combined in the future for analysis. In yet another embodiment, a separate app on the portable computing device 500 may monitor the context data on the portable computing device 500 and may perform the analysis.

At block 110, the context data may be analyzed. The analysis of the context data may take on a variety of forms and may be undertaken in a variety of ways. The form and manner of the analysis may be set by a carrier, by a user, by a third party or by a combination of the carrier and the user. The analysis may analyze a variety of pieces of context data at a point in time. For example, the method may analyze the total battery drain considering other the context data at a point in time or over a plurality of points in time. Further, some apps may operate in the background and the analysis make take into account the background apps. Moreover, some apps may rely on other apps and the combination may be taken into account.

Similarly, the drain rate of the battery may be analyzed for specific apps considering other the context data at the point in time or at a plurality of points in time. The drain rate may indicate how fast a battery is draining at a point in time. In some embodiments, the system and method may be able to determine which application is draining the battery. In other systems and method, the system may watch the battery over time and estimate which application is draining the battery at a determined rate. For example, if a first application is running, the battery drain may be attributable to the first application. In other embodiments, processor cycles attributable to each app may be used to estimate battery drain. The drain analysis may be for a single app or for a combination of apps operating at the same time. Further, some apps may operate in the background and the analysis make take into account the background apps. In addition, in some situation, the portable computing device 500 may be using a separate power source such as an electrical outlet or additional battery pack which may change the concerns about battery drain.

In addition, the bandwidth usage rate for the specific apps at the point in time may be analyzed. The amount of data communicated to and from the portable computing device 500 to an application may be determined and may be useful to determine a floor of bandwidth needed and an ideal bandwidth rate if possible. The bandwidth determination may be for a single app or for a combination of apps operating at the same time. Further, some apps may operate in the background and the analysis make take into account the background apps.

In yet another aspect, the network latency required by the specific apps at the point in time may be analyzed. The analysis may determine a floor of latency that would be accepted to still execute an application. The analysis may also determine an ideal latency for a single app or for a combination of apps that may be operating at the same time. Further, some apps may operate in the background and the analysis make take into account the background apps.

In another aspect, the current battery level at the point in time may be analyzed. By tracking the battery level and matching up the various app that are present and the battery drain that is occurring to determine if the battery level has an effect on performance of the various apps and communication forms.

In yet another aspect, the battery drain by each communication form may be analyzed. A portable computing device 500 may use more than one communication form and each communication form may drain the battery in a different way. For example, an ultra high frequency 5G signal may have a more aggressive battery drain than a Wi-Fi signal. In addition, the signal strength of the various communication forms may be tracked and analyzed in relation to battery drain. For example, a weak 4G signal may cause the portable computing device 500 to use maximum power to efficiently communicate with a base station which may aggressively drain the battery.

Error rates of communication forms may also be analyzed in relation to the apps present, apps being used, battery level, battery drain and communication form. Some apps may be more open to errors and resend requests while other apps may require communication with less errors that is more efficient.

In one embodiment, the data may be stored in a database that is easily searched and queried. A sample database may be illustrated below.

| | bandwidth floor | latency floor | error rate ceiling | battery drain rate (milli amps per hour) |
| --- | --- | --- | --- | --- |
| app 1 | 10 MB | 0.1 sec | 1% | 20 |
| app 2 | 5 MB | 0.2 sec | 10% | 30 |
| app 3 | 1 MB | 0.5 sec | 20% | 10 |
| app 4 | 50 MB | 0.01 | 0.5% | 50 |
| app 5 | 10 MB | 0.1 sec | 1% | 25 |
| app 1, 2 | 15 MB | 0.1 sec | 1% | 50 |
| apps 1, 2, 3 | 16 MB | 0.1 sec | 1% | 55 |
| apps 2, 3, 4 | 60 MB | 0.01 sec | 0.5% | 100 |

Depending on the apps being used, the floor for bandwidth may be determined. Similarly, the latency floor, the acceptable error rate ceiling and the power used may be determined. Of course, the determinations may be updated in view of the actual usages rather than the determined usages. For example, the bandwidth floor may be artificially high as not all the apps may require the maximum bandwidth at the same time as there may be peaks and valleys in bandwidth demand which may even out over time. In addition, apps may work together in unexpected ways which may drain the battery more than expected.

As will be explained further in this disclosure, reinforcement learning may be used to determine or further refine the communication needs. For example, a game player may always want less latency even if such latency is not possible at a point in time. Similarly, a user may be able to watch a sporting event, but the bandwidth may result in the picture having glitches and freezing for moments in time. The system may believe that the communication was successful while a user may believe the communication needs to be improved. By taking into account user feedback, the communication floors may be improved.

At block 120, optimal connection characteristics based on the analysis of the context data may be determined. What is optimal may be based on one or more conditions such as the necessary bandwidth or available battery life. Each of the data aspects may be used as conditions to optimize the other data aspects. For example, battery life may be a condition to be maximized. Based on the apps operating, the communication form may be selected to maximize battery life in view of the battery life. Logically, many data aspects may be optimized. The priority of the data aspects to be optimized may be set by a user, by a cellular provider or by a third party.

In addition, more than one data aspect may be optimized. For example, bandwidth and latency may be optimized if the portable computing device 500 is connected to a secondary power source. Logically in some instances, the data aspect may be minimized (latency for example) and in some instances the data aspect may be maximized (bandwidth for example).

In another aspect, a floor of context data values may be determined and used to select a communication form. For example, the system and method may determine, by using machine learning, for example, that at a specific location on Saturday, a user is very likely to run a video service such as YouTube at that moment, and the method may have a YouTube profile with optimal throughput, latency, and power consumption (aka battery drain rate). With these optimal connection characteristics (a "target") in place, and current battery level, the system and method may analyze all available connection options at a specific location/time, and pick the optimal fit (for example, WiFi).

In one embodiment, the communication signals may be tested by the portable computing device 500 to determine bandwidth availability, bandwidth latency, bandwidth error rate, and power usage by the portable computing device 500. The connection forms may include Wi-Fi, 3g, 4g, 4g lte, 5g band a, 5g band b and 5g band c.

|  | bandwidth floor | latency floor | error rate ceiling | power use max (mA) |
|---|---|---|---|---|
| WiFi | 100 MB | 0.01 sec | 0.01% | 200 |
| 5G mm Wave | 300 MB | 0.001 sec | 0.1% | 300 |
| 4G LTE | 150 MB | 0.1 | 0.5% | 100 |

Figure 2:
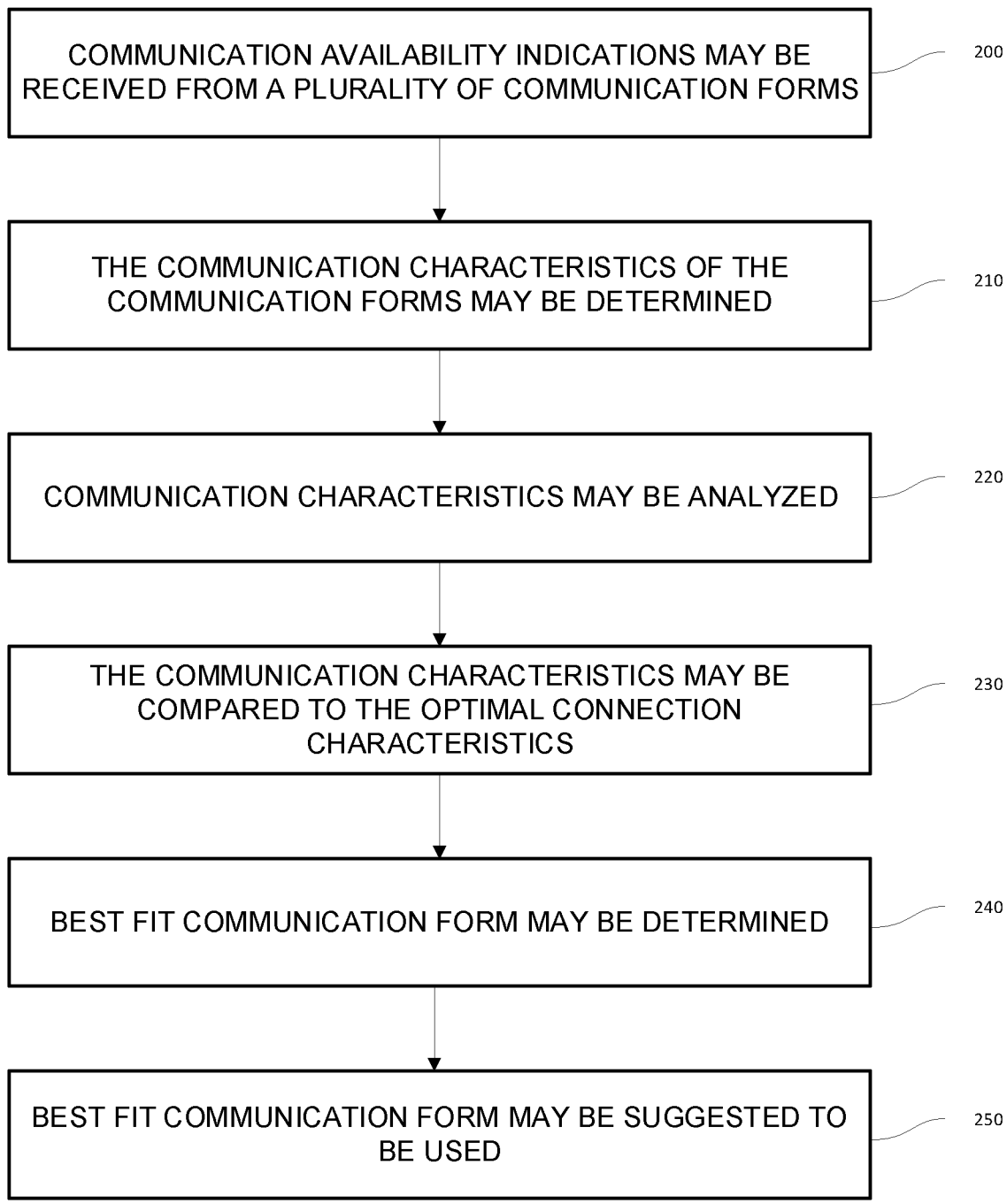
FIG. 2 may illustrate communication modes available at a location.

Referring to FIG. 2, a sample analysis process may be illustrated. At block 200 communication availability indications may be received from a plurality of communication forms. The portable computing device 500 may receive the variety of signals through antennas that may operate on the portable computing devices 500. If the signal is a signal that is not able to be received on the portable computing device 500, it may not be analyzed.

At block 210, the communication characteristics of the communication forms may be determined. The communication characteristics may include latency, bandwidth, battery requirements, signal strength and error rate.

At block 220, the communication characteristics may be analyzed. In some embodiments, the communication characteristics may be ranked according to a criteria. In some embodiments, the criteria may be a default criteria such as highest to lowest. In other embodiments, the criteria may be set by a user. In other embodiments, the criteria may be determined using machine learning to analyze past criteria and the resulting performance issues.

In other embodiments, machine learning to analyze past context data and communication forms and the resulting performance issues. The machine learning may examine past concept data and communication form and past results on the portable computing device 500 and determine how communication characteristic may ranked in view of the demands on the portable computing device 500. Machine learning may be used to analyze past results in view of the actual results, so that the determination of a proper communication form or characteristics of the form in view of the context data at the point in time becomes more accurate. Machine learning may be used to review a training group of past results and determine improved results moving forward. Machine learning based on analyzing past data may be referred to as supervised machine learning.

Figure 3:
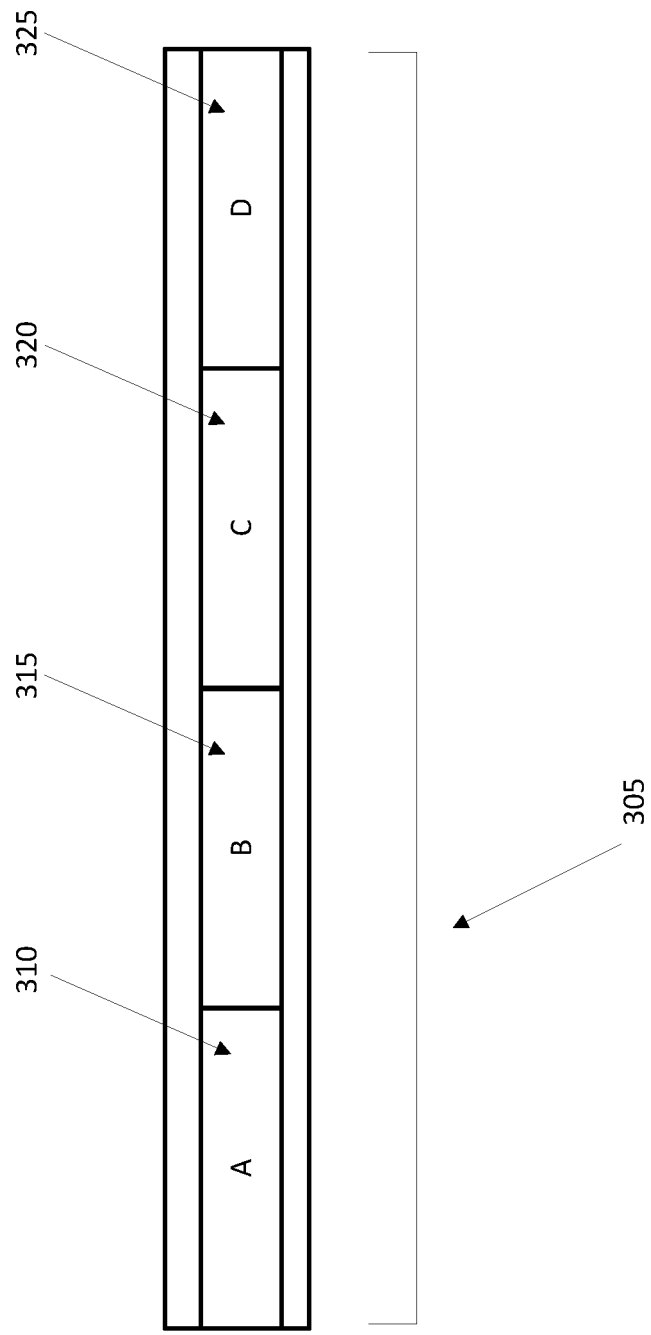
FIG. 3 may be an illustration of blocks of data being used to train a machine learning system.
Figure 4A:
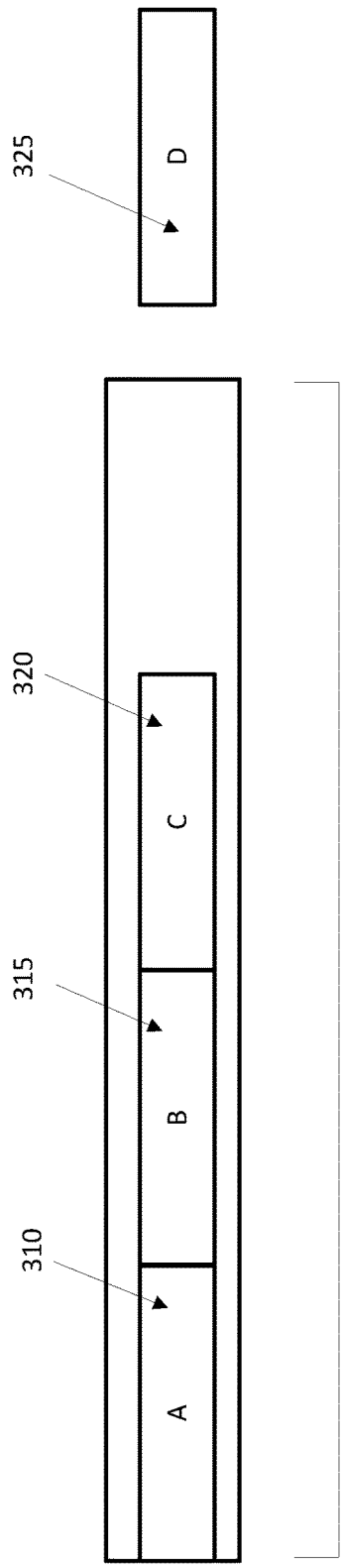
FIG. 4A may be an illustration of blocks of data rotated to train a machine learning system.
Figure 4B:
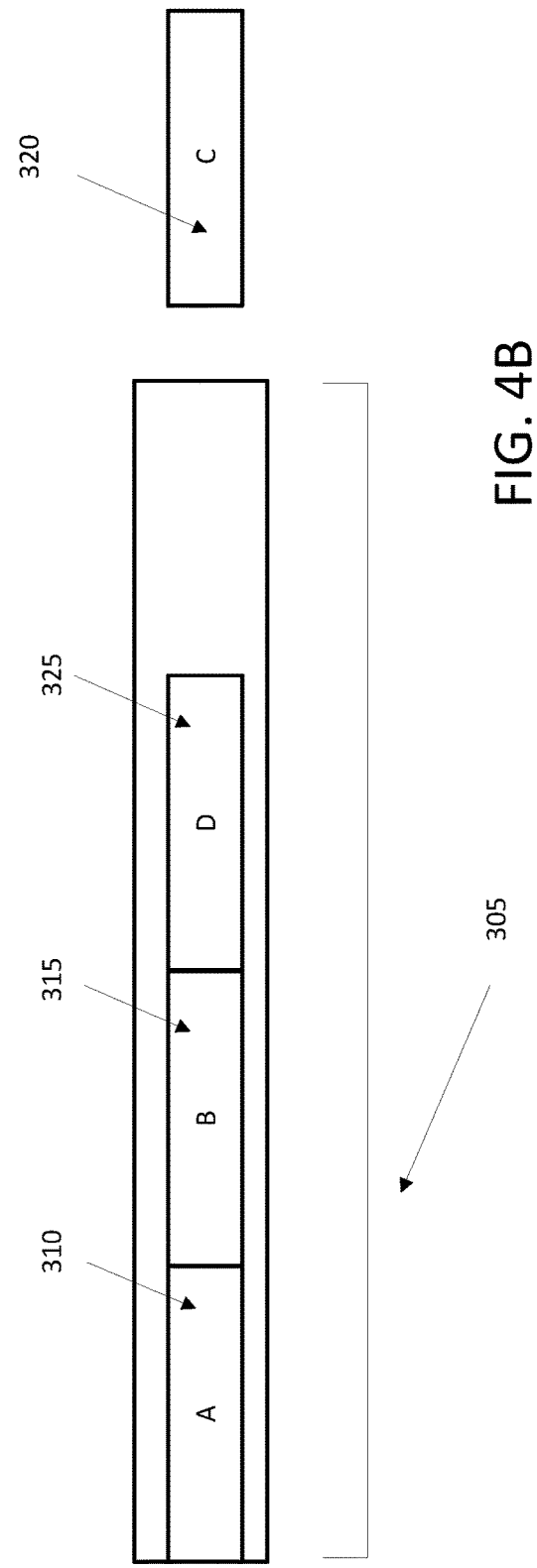
FIG. 4B may be an illustration of blocks of data rotated to train a machine learning system.

FIG. 3 may illustrate sample artificial intelligence (AI) training data according to one or more embodiments. As an example and not a limitation, an artificial intelligence system may trained by analyzing a set of training data 305. The training data may be broken into sets, such as set A 310, set B 315, set C 320 and set D 325. As illustrated in FIG. 4A, one set may be used as a testing data set (e.g., set D 325) and the remaining sets may be used as a training data set (e.g., set A 310, set B 315 and set C 320). The artificial intelligence system may analyze the training data set (e.g., set A 310, set B 315 and set C 320) and use the testing set (e.g., set D 325) to test the model created from the training data. The data sets may shift as illustrated in FIG. 4B, where the testing data set may be added to the training data sets (e.g., set A 310, set B 315 and set D 325) and one of the training data sets that has not been used to test before (e.g., set C 320) may be used as the testing data set. The analysis of the new training data (e.g., set A 310, set B 315 and set D 325) may occur again with the new testing set (e.g., set C 320) being used to test the model and the model may be refined. The rotation of data sets may occur repeatedly until all the datasets have been used as the test data set. The model then may be considered complete and the model may then be used on additional data sets. Sample uses of supervised machine learning may include 1) predicting what app(s) a user will run next at a specific location/time; or 2) predicting network performance characteristic and battery drain rate of that communication form. Both can be inferred from past data gathered on-device.

Reinforcement learning may also be used. Reinforcement learning is about taking suitable action to maximize reward in a particular situation. Reinforcement learning is employed by various software and machines to find the best possible behavior or path it should take in a specific situation. Reinforcement learning differs from the supervised learning in a way that in supervised learning the training data has the answer key with it so the model is trained with the correct answer itself whereas in reinforcement learning like machine learning, there is no answer but the reinforcement agent decides what to do to perform the given task based on its interaction with the environment and the rewards it can obtain. In the absence of a training dataset, it is bound to learn from its experience.

Input: The input should be an initial state from which the model will start (what is the context data)

Output: There are many possible output as there are variety of solution to a particular problem (what is the communication form)

Training: The training is based upon the input, the model will return a state and the user will decide to reward or punish the model based on its output.

The model keeps continues to learn.

The best solution is decided based on the maximum reward.

Types of Reinforcement: There are two types of Reinforcement:

Positive—

Positive Reinforcement is defined as when an event occurs due to a particular behavior, increases the strength and the frequency of the behavior. In other words, it has a positive effect on behavior.

Advantages of reinforcement learning are:
a. Maximizes Performance
b. Sustain Change for a long period of time
Disadvantages of Reinforcement Learning:
c. Too much Reinforcement can lead to overload of states which can diminish the results Negative—

Negative Reinforcement is defined as strengthening of a behavior because a negative condition is stopped or avoided.

Advantages of Reinforcement Learning:
a. Increases Behavior
b. Provide defiance to minimum standard of performance
Disadvantages of Reinforcement Learning:
c. It Only provides enough to meet up the minimum behavior Reinforcement learning may be used to learn a user's preference between battery life vs user experience. The concept may be that one user may prefer saving more battery when battery remaining is around 40%, thus the user will prefer to not use a high battery draining high-throughput network even if that network may provide a better experience. Other users may be very aggressive and accepting of draining a battery quickly while leveraging super-fast and battery draining 5G cellular connection to play games. This preference between battery life and network mode performance may even change over time for the same person. By using reinforcement learning, once a user takes action to choose a network to use (thus overriding a computer base recommendation), the reinforcement learning may learn from that action and use it later.

At block 230, the communication form characteristics such as bandwidth, latency, and error rates at a location at a point in time may be compared to the optimal connection characteristics. For example, an app may have a bandwidth floor and a first communication form at a location at a point in time may not meet the floor and may be ranked lower than a communication form that exceeds the floor. For example, in one embodiment, an optimal connection characteristics may include determining, based on the analysis of a plurality of points in time in the past, a latency threshold and a bandwidth threshold in view of the apps in use and the battery life available at the present time. As an example, a home connection with great WiFi may be a better communication form than a 5G signal than barely reaches the home as WiFi may have bandwidth and latency that exceed the floor in view of the context data while 5G may not. Logically, if the user moves further from the home WiFi signal and closer to a 5G antenna, the 5G communication mode may be superior.

At block 240, a best fit communication form may be determined. Determining a best fit communication form may include determining which communication form is over the latency threshold and over the bandwidth threshold and results in the minimum battery drain if battery drain in a concern at a specific location at a point in time. The latency threshold may be determined by analyzing past performance of the portable computing device 500 that was executing similar apps and determining the latency that allowed for acceptable app performance. The bandwidth threshold may be determined by analyzing past performance of the portable computing device 500 was executing similar apps and determining the bandwidth that allowed for acceptable app performance. In addition, reinforcement learning may be used to determine the communication form in view of the context data that may be present at a point in time.

At block 250, the best fit communication form may be suggested to be used. As mentioned previously, reinforcement learning may be used to assist in determining the communication mode to use based on past approvals from a user and past results from using the communication mode based on the approval from the user and from application performance. The approval from the user may be positive approval such a as a certain communication made works great for the apps in question or in view of the battery drain in view of the apps being used and the communication mode being used. In the alternative, the feedback may be negative where a user may complain or not approve of a particular communication mode in view of the apps being used and possibly the battery drain in the portable computing device while the communication mode is question was used. By tracking the apps being used at the time, the communication mode being used at the time and the approval or disapproval of a user, a matrix of acceptable and unacceptable communication modes in view of the apps being used and the communication modes available may be created. In the future, the matrix may be consulted and the appropriate communication mode may be suggested with ever increasing accuracy.

In another aspect, the system and method may use the context data to predict which connection source may be appropriate. For example, if the context data shows it is Friday night and for the last five Fridays in a row, a user has approved the use of a 4GLTE communication form at a given house when playing a first app, the system and method may predict that the next Friday night the use may desire to use 4GLTE when the user opens the app at the friend's house. In some instances, all the context data may not overlap perfectly, but over time, the system and method may learn that one piece of context data drives the communication form decision. For example, when a user is at a shopping mall, 5G may be the selected source but the user while if a user is watching a sporting event on a portable computing device, the communication form may be different. In one example, the location (the shopping mall) drive the communication form decision and in the other example, the app in use (watch sports) may dictate the communication form. Logically, by using reinforced learning or other machine learning type of algorithms, the key combination of context data that drive the communication form selection may be determined and used to make predictions for the future.

FIG. 5 may be an example electronic device 500 such as a portable computing device that is part of the system that may be used to execute the blocks of the method described in relation to FIGS. 1 and 2. The electronic device 500 may be physically configured to interact or communicate with other electronic devices via a communication network, such as a Wi-Fi network or a cellular network, for example, cellular network. The electronic device 500 may have a processor 550 that is physically configured according to computer executable instructions as the logic gate may be physically altered according to the computer executable instructions. The electronic device 500 may have a power supply 555 such as a battery, which may be rechargeable. The electronic device 500 may also have a sound and video module 560 which assists in displaying video and sound and may turn off when not in use to conserve power and battery life. The electronic device 500 may also have volatile memory 565 and non-volatile memory 570 as well as internal storage 575 or external storage. The electronic device 500 may have an input/output bus 590 that shuttles data to and from various user input devices such as a keyboard, mouse, speakers, or other inputs. It also may control communicating with other electronic devices and system components, either through wireless or wired devices. Of course, this is just one embodiment of the electronic device 500 and the number and types of electronic devices 500 is limited only by the imagination.

In accordance with the provisions of the patent statutes and jurisprudence, exemplary configurations described above are considered to represent one embodiment of the disclosure. However, it should be noted that the teachings of the disclosure can be practiced otherwise than as specifically illustrated and described without departing from its spirit or scope.

Additionally, certain embodiments are described herein as including logic or a number of components, modules, blocks, or mechanisms. Modules and method blocks may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a processor configured using software, the processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled via control signals. Where multiple of such hardware modules exist contemporaneously, communications may be achieved through a signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within an environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within an environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of monitoring portable communication devices to analyze context data to maximize performance comprising:
 monitoring context data on a portable communication device of a user wherein context data comprises at least two of:
  time of day;
  location;
  signal strength of various communication forms;
  applications used;
  throughput needed for the applications;
  latency needed;
  battery usage;
 analyzing the context data;
 determining an optimal connection characteristics based on the analysis of the context data;
 receiving communication availability indications from a plurality of communication forms;
 determining the communication characteristics of the communication forms wherein the communication characteristics comprise at least two of:
  latency;
  bandwidth;
  battery requirements;
  signal strength;
  error rate;
 analyzing the communication characteristics;
 comparing the communication characteristics to the optimal connection characteristics;
 determining a best fit communication form; and
 suggesting the best fit communication form be used;
 wherein analyzing the context data comprises:
  analyzing the total battery drain considering other the context data at a point in time;
  analyzing the drain rate of the battery for specific apps considering the context data at the point in time;
  analyzing the bandwidth usage rate for the specific apps at the point in time;
  analyzing the latency rate required by the specific apps at the point in time;
  analyzing the current battery level at the point in time; and
  analyzing the battery drain by each communication form.

2. The method of claim 1, wherein determining an optimal connection characteristics based on the context data comprises determining, based on the analysis of a plurality of points in time in the past, a latency threshold and a bandwidth threshold in view of the apps in use and the battery life available at the present time.

3. The method of claim 2, wherein determining a best fit communication form further comprises:
 determining which communication form is over the latency threshold and over the bandwidth threshold and results in the minimum battery drain.

4. The method of claim 3, wherein the latency threshold is determined by analyzing past performance of the portable computing device 500 was executing similar apps and determining the latency that allowed for acceptable app performance.

5. The method of claim 3, wherein the bandwidth threshold is determined by analyzing past performance of the portable computing device 500 was executing similar apps and determining the bandwidth that allowed for acceptable app performance.

6. The method of claim 1, wherein the analysis uses supervised machine learning to review past communication form data and predicts communication performance given context data at that point in time.

7. The method of claim 1, wherein the analysis comprises using reinforcement learning to analyze a user's interaction with the device to understand the user's preferences and tradeoff between communication form selection and battery life, and use that to determine optimal communication to be used.

8. The method of claim 1, wherein the communication signals are tested by the portable computing device 500 to determine bandwidth availability, bandwidth latency, bandwidth error rate, and power usage by the portable computing device 500.

9. The method of claim 1, wherein the connection forms comprise:
Wifi;
3g;
4g;
4g lte;
5glow band;
5g mid band; and
5g mmWave.

10. A tangible non-transitory computer readable medium physically configured to store computer executable instruction for a method of monitoring portable communication devices to analyze context data to maximize performance comprising:
monitoring context data on a portable communication device of a user wherein context data comprises at least two of:
time of day;
location;
signal strength of various communication forms;
applications used;
throughput needed for the applications;
latency needed;
battery usage;
analyzing the context data;
determining an optimal connection characteristics based on the analysis of the context data;
receiving communication availability indications from a plurality of communication forms;
determining the communication characteristics of the communication forms wherein the communication characteristics comprise at least two of:
latency;
bandwidth;
battery requirements;
signal strength;
error rate;
analyzing the communication characteristics;
comparing the communication characteristics to the optimal connection characteristics;
determining a best fit communication form; and
suggesting the best fit communication form be used;
wherein analyzing the context data comprises:
analyzing the total battery drain considering other the context data at a point in time;
analyzing the drain rate of the battery for specific apps considering the context data at the point in time;
analyzing the bandwidth usage rate for the specific apps at the point in time;
analyzing the latency rate required by the specific apps at the point in time;
analyzing the current battery level at the point in time; and
analyzing the battery drain by each communication form.

11. The non-transitory computer readable medium of claim 10, wherein determining an optimal connection characteristics based on the context data comprises determining, based on the analysis of a plurality of points in time in the past, a latency threshold and a bandwidth threshold in view of the apps in use and the battery life available at the present time.

12. The non-transitory computer readable medium of 11, wherein determining a best fit communication form further comprises:
determining which communication form is over the latency threshold and over the bandwidth threshold and results in the minimum battery drain.

13. The computer non-transitory readable medium of claim 12, wherein the latency threshold is determined by analyzing past performance of the portable computing device was executing similar apps and determining the latency that allowed for acceptable app performance and determining the bandwidth that allowed for acceptable app performance.

14. A computer system comprising a processor physically configured according to computer executable instructions for a method of monitoring portable communication devices to analyze context data to maximize performance, a memory physically configured to store the instructions and an input output circuit, the computer executable instructions comprising instructions for:
monitoring context data on a portable communication device of a user wherein context data comprises at least two of:
time of day;
location;
signal strength of various communication forms;
applications used;
throughput needed for the applications;
latency needed;
battery usage;
analyzing the context data;
determining an optimal connection characteristics based on the analysis of the context data;
receiving communication availability indications from a plurality of communication forms;
determining the communication characteristics of the communication forms wherein the communication characteristics comprise at least two of:
latency;
bandwidth;
battery requirements;
signal strength;
error rate;
analyzing the communication characteristics;
comparing the communication characteristics to the optimal connection characteristics;
determining a best fit communication form; and
suggesting the best fit communication form be used;
wherein analyzing the context data comprises:
analyzing the total battery drain considering other the context data at a point in time;
analyzing the drain rate of the battery for specific apps considering the context data at the point in time;
analyzing the bandwidth usage rate for the specific apps at the point in time;
analyzing the latency rate required by the specific apps at the point in time;
analyzing the current battery level at the point in time; and
analyzing the battery drain by each communication form.

* * * * *